May 7, 1974     W. E. HUTCHISON     3,809,581
LONG-TERM DEEP SUBMERGENCE BATTERY POWER SUPPLY
Filed Sept. 3, 1971
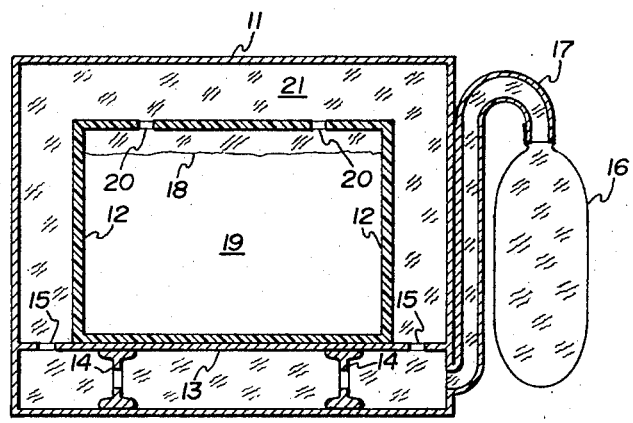
INVENTOR.
WILLISTON E. HUTCHISON
BY
*Richard K. Macneill*

United States Patent Office 3,809,581
Patented May 7, 1974

3,809,581
LONG-TERM DEEP SUBMERGENCE BATTERY
POWER SUPPLY
Williston E. Hutchison, 7945 Michelle Drive,
La Mesa, Calif. 92037
Filed Sept. 3, 1971, Ser. No. 177,745
Int. Cl. H01m 11/00
U.S. Cl. 136—161     1 Claim

ABSTRACT OF THE DISCLOSURE

A long-term deep submergence battery power supply utilizing nickel cadmium batteries submerged in a combination of electrolyte and dielectric oil with provision for a pressure equalization.

BRIEF DESCRIPTION OF THE INVENTION

The present invention relates to a long-term deep submergence power supply and more particularly to a long-term deep submergence power supply utilizing pressure equalization.

According to the invention, a long-term deep submergence power supply is provided in which the battery plates are substantially submerged in an electrolyte having a compensated dielectric oil layer above the electrolyte. The long-term capability of this configuration is based upon the principle that atomic-sized particles of a gaseous material will migrate from a denser (electrolyte) to a less dense medium (dielectric oil) when under pressure; that atomic-sized particles of hydrogen and oxygen are more readily absorbed into battery plates from a less dense medium than the original electrolyte and that the products of electrolysis will more readily re-combine into water on the surface of the battery plates while contained under pressure and in an oily substance than in the original electrolyte. All of these factors combined will result in no significant loss of electrolyte and, thus, the battery will never need additional water as it normally would if operated in a free atmosphere.

To maintain the battery's charge over long periods of time, a conventional radio isotope thermal generator can be provided which would be coupled for charging to the battery upon the excitation of the battery's working load and de-coupled from the battery when a predetermined charge has been reached.

An object of the present invention is the provision of an improved long-term deep submergence power supply.

A further object of the invention is the provision of a long-term deep submergence power supply utilizing battery techniques which do not require the addition of water.

Yet another object of the invention is the provision of a long-term deep submergence power supply which is inexpensive and simple to manufacture and requires substantially no upkeep during its useful life.

Other objects and many of the attendant advantages will be readily appreciated as the same becomes better understood by reference to the following detailed description when considered in connection with the accompanying drawings in which like reference numerals designate like parts throughout the figures thereof and wherein the sole figure is a schematic representation of the battery construction utilized in the present invention.

DETAILED DESCRIPTION OF THE DRAWING

Referring to the drawing, the construction details of battery 12 are shown schematically. Battery case 11 contains battery 12 carried by bottom plate 13 suspended by I beams 14. Bottom plate 13 has ports 15 for equalizing pressure throughout the inside of case 11. Battery 12 ports 20 for pressure equalization therein. Here, it has been found that by utilizing an electrolyte 19 over approximately three-fourths of the area of the plates of battery 12, and a dielectric oil 21 over one-fourth of the plate area to level 18. Sea pressure is introduced through bladder 16 and coupling line 17, which does not allow dielectric oil 21 to escape. As the pressure increases, equalizing bladder 16 compresses, and as pressure equalizes with the outside sea pressure.

It should be understood, of course, that the foregoing disclosure relates to only a preferred embodiment of the invention, and that it is intended to cover all changes and modifications of the example of the invention herein chosen for the purposes of the disclosure which do not constitute departures from the spirit and scope of the invention.

The invention claimed is:

1. A long-term deep submergence battery power supply comprising:
    a battery having battery plates therein;
    a battery case, said battery being received by said battery case;
    an electrolyte filling said battery to an intermediate level of said battery plates;
    a dielectric oil filling the remainder of said battery and completely covering battery plates within said battery case; and
    a pressure-sensitive means in contact with a lower portion of said battery case.

References Cited
UNITED STATES PATENTS

| | | | |
|---|---|---|---|
| 2,930,828 | 3/1960 | Herold | 136—6 |
| 3,160,525 | 12/1964 | Hutchison et al. | 136—166 |
| 3,544,372 | 12/1970 | Bridge et al. | 136—166 |

ALLEN B. CURTIS, Primary Examiner

H. A. FEELEY, Assistant Examiner

U.S. Cl. X.R.
136—6, 166